United States Patent
Horst et al.

(10) Patent No.: US 9,195,862 B2
(45) Date of Patent: Nov. 24, 2015

(54) RADIO FREQUENCY IDENTIFICATION READER AND A METHOD FOR LOCATING A TAG BY THE RADIO FREQUENCY IDENTIFICATION READER

(75) Inventors: Dieter Horst, Cadolzburg (DE); Dan Yu, Beijing (CN); Yong Yuan, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 319 days.

(21) Appl. No.: 13/979,838

(22) PCT Filed: Jan. 14, 2011

(86) PCT No.: PCT/CN2011/070279
§ 371 (c)(1),
(2), (4) Date: Oct. 4, 2013

(87) PCT Pub. No.: WO2012/094825
PCT Pub. Date: Jul. 19, 2012

(65) Prior Publication Data
US 2014/0022059 A1  Jan. 23, 2014

(51) Int. Cl.
*H04Q 5/22*  (2006.01)
*G06K 7/00*  (2006.01)
*G06K 7/10*  (2006.01)
*G01S 13/84*  (2006.01)
*G01S 13/75*  (2006.01)

(52) U.S. Cl.
CPC ............... *G06K 7/0008* (2013.01); *G01S 13/84* (2013.01); *G06K 7/10009* (2013.01); *G01S 13/75* (2013.01)

(58) Field of Classification Search
CPC ............ G06K 7/0008; G06K 7/10009; H04L 2027/003; H04L 2027/0057; H04L 27/362; H04L 27/365; H04L 27/3854; H04L 27/3872; G01S 13/74; G01S 13/75; G01S 13/84; G01S 3/00
See application file for complete search history.

(56) References Cited

U.S. PATENT DOCUMENTS

| 5,471,508 A  * | 11/1995 | Koslov .......................... 375/344 |
| RE42,643 E  * | 8/2011 | Oshima et al. ................ 375/219 |
| 2007/0241904 A1 | 10/2007 | Ozaki et al. |
| 2007/0297534 A1 * | 12/2007 | Okunev ........................ 375/316 |
| 2008/0198903 A1 | 8/2008 | Kawai |

FOREIGN PATENT DOCUMENTS

| CN | 101046843 | 10/2007 |
| CN | 101853413 | 10/2010 |
| JP | 2009-270901 | 11/2009 |

* cited by examiner

*Primary Examiner* — Kerri McNally
*Assistant Examiner* — Renee Dorsey
(74) *Attorney, Agent, or Firm* — Cozen O'Connor

(57) ABSTRACT

A radio frequency identifying reader (RFID) and a method for locating a tag by the RFID includes transmitting, by the RFID reader, signals to the tag on at least two frequencies and receiving a corresponding reflection signal, combining, by the RFID reader, received reflection signals and acquiring the combined signal which is received, and mapping the combined signal that is received to a constellation point in a constellation map to locate the tag such that the tag can be more easily located.

21 Claims, 10 Drawing Sheets

RADIO FREQUENCY IDENTIFICATION READER AND A METHOD FOR LOCATING A TAG BY THE RADIO FREQUENCY IDENTIFICATION READER

CROSS-REFERENCE TO RELATED APPLICATIONS

This is a U.S. national stage of application No. PCT/CN2011/070279 filed 14 Jan. 2011.

BACKGROUND OF THE INVENTION

1. Field of the Invention

The present invention relates to the field of radio frequency identification (RFID), and, more particularly, to a radio frequency identification reader and to a method for locating a tag using the radio frequency identification reader.

2. Description of the Related Art

Compared with high frequency (HF) radio frequency identification (RFID) systems, ultra high frequency (UHF) RFID has many superior properties, such as fast tag accessing speed, cheap tags, and the ability to perform tagging at the level of individual items in both manufacturing and logistics applications. However, in view of the far-field electromagnetic transmission characteristics of UHF RFID, for instance, multi-path transmission, it is difficult to maintain a controlled reading zone for UHF RFID. There may be certain reading gaps (i.e., field nulls) in the required reading zone, which make reading less reliable in that zone. Cross reading may also occur during identification of remote tags outside the zone. This lack of control over the reading zone causes major problems in manufacturing and logistics applications.

In manufacturing applications, the system must ascertain precisely when a tag enters the reading zone, and when the tag leaves the reading zone. Taking workpiece identification applications as an example, the system must ascertain precisely which tags are really inside the reading zone, in order to subject the workpieces attached to these tags to further processing. However, multi-path transmission may cause the system to mistakenly identify tags outside the reading zone, and correspondingly to execute an erroneous processing command on the workpiece which is about to arrive.

There may be similar problems in logistics applications:

(1) In luggage tracking applications at airports, the lack of control over the reading zone results in difficulty in distinguishing between tagged luggage bags when they pass the antenna. To solve this problem, an expensive box made from material that absorbs radio waves must be used to control the reading zone.

(2) In forklift applications with multiple inlets, signal leakage leads to the reader cross-reading tags of inlets that are not the object of interest. As a result, it is very difficult to correctly identify movement of goods through different inlets.

(3) There is a similar impact in applications where the load of a goods forklift is to be accurately identified. The multi-path problem results in a forklift equipped with an RFID system being unable to effectively distinguish between a background tag and a tag on the forklift pallet.

It is evident that all of the application scenarios mentioned above require a controlled reading zone: within the required reading zone, tags can be read reliably and there are no field nulls; outside the reading zone, cross reading will not occur. It must be pointed out that control over reading zones in UHF RFID is an excellent research subject both from an industrial and an academic perspective. Existing solutions can be divided into two types: the first provides a controlled reading zone by improving and utilizing current RFID communication methods, while the second uses auxiliary measures to enhance current RFID systems.

I. The first type of solution concentrates on the following two aspects:

1. Using a Far-Field Antenna to Filter Remote Tags, and Thereby Controlling the Reading Zone (1) OMRON proposes some solutions in US20070241904A1 and US20080198903A1, according to which the tag distance is measured by detecting phase difference in reflected carriers so as to perform distance filtering.

To overcome the multi-path problem, US20070241904A1 uses different frequencies to communicate with tags at different times, and records the phase shift of backscattered carriers on each frequency, so as to measure tag distance on each frequency. However, this solution is unable to detect a phase difference of 360 degrees when a tag moves a distance of half a wavelength.

US20080198903A1 discloses a solution for locating a tag based on phase differences in two carriers of different frequencies. Ambiguity of distance measurement will not occur in this solution, but this solution can only analyze static phase differences on the two frequencies, and so can only obtain one fixed distance of a tag. Moreover, this solution is likely to be affected by the surrounding environment; for example, the phase differences will be affected by all reflective objects. If there is a metal plate very close to the tag, it will be impossible to distinguish between a reflection from the tag and a reflection from the metal plate by analyzing the phase differences. To solve this problem, the pattern in which phase difference varies with time must be analyzed. Because there is an ambiguity of 360 degrees in a conventional IQ structure on each frequency, however, this solution is unable to obtain the above pattern.

(2) Intermec proposes a solution in which phase change in a conventional IQ structure is detected when a single carrier is used, and also proposes three phase difference of arrival (PDOA) methods in the time domain, frequency domain and spatial domain.

(3) Pavel et al. propose a solution capable of accurately locating a tag based on the phase difference between two or more receiving antennas.

Since only a single carrier is used each time in solutions (2) and (3), these solutions have a similar flaw to that of solutions (i) (proposed by OMRON).

(4) In CN0160421A, AutoID Fudan proposes a solution based on direct sequence spread spectrum (DSSS) technology. In this solution, the backscattered signal from the tag is spread using DSSS technology. The reader then subjects the signal reflected from the tag to distance measurement based on the time difference (time of flight (TOF), using fast correlation. It must be pointed out that the reliability and accuracy of this solution are dependent on the speed of the pseudorandom noise (PN) code to a large degree. However, owing to the spreading operation, the use of a high-speed PN code will introduce a need for greater bandwidth, which cannot be supported by many existing RFID communication specifications.

(5) Different solutions have been proposed by Alien and Impinj, in which the reading zone is controlled indirectly by measuring the direction and speed of movement of the tag. However, this solution is only effective in scenarios involving moving tags. A new solution is required for scenarios involving stationary tags, i.e., this solution is not suitable for use with both stationary tags and moving tags.

2. Using a Near-Field (NF) Antenna to Control the Reading Zone

Another feasible solution to the problem of control over reading zones is a near-field UHF antenna. In this solution, a magnetic coupling scheme replaces radio wave transmission. Furthermore, the far-field gain of the antenna can be designed to be very small (e.g., −20 dBi). Thus it can be used to construct a controlled reading zone (see US20080048867A1). However, wavelengths are very small (about 30 cm) in the UHF band, and it is difficult to design an NF antenna with a large reading distance. Moreover, the far-field gain is proportional to the NF reading distance. Most NF antennas have a reading distance of about 5 cm; the maximum distance of a commercially available NF antenna is just 15 cm, and the far-field gain thereof can be as high as 6 dBi. Therefore, it is very difficult to design an NF antenna with a long NF distance and a small far-field gain.

II. The main feature of the second type of solution is the introduction of auxiliary measures, and the attempt to obtain a controlled reading zone using these auxiliary measures.

(1) A solution proposed by Fujitsu involves using an infrared sensor on an antenna support to detect when a tag enters or leaves the reading zone, and setting a time for antenna switching based on the above information, so as to improve the efficiency of reading/writing large amounts of data relating to multiple moving tags.

(2) Different solutions have been proposed by Sverre Holm et al. and Mary Catherine et al. for integrating ultrasound into an RFID system. In these solutions, ultrasound may be used independently to obtain distance information for further processing, or a tag may be located based on the difference in ultrasound and RF transmission times.

(3) Another conventional solution uses a material that absorbs radio waves to restrict transmission of radio waves. For instance, in airport luggage processing applications, a box made from an expensive material that absorbs radio waves is used to cover the required reading zone, and only tags that pass through the box will be read.

All these solutions require the use of new measures to obtain a controlled reading zone, increasing the cost of the entire system considerably. In some cases, the new measure (e.g., the box for absorbing radio waves) has a higher cost than the RFID system.

SUMMARY OF THE INVENTION

In view of the foregoing, it is therefore an object to provide a method for locating a tag using a radio frequency identification reader, and a radio frequency identification reader, by which a tag may be located more effectively.

These and other objects and advantages are achieved in accordance with the invention by a method for locating a tag using a radio frequency identification (RFID) reader comprising A. the reader transmitting a signal to the tag on at least two frequencies and receiving a corresponding reflected signal, and B. subjecting the reflected signal received to a combining operation to obtain a combined received signal, and mapping the combined received signal to a constellation point on a constellation diagram for the purpose of locating the tag.

The at least two frequencies comprise: a first frequency f1 and a second frequency f2, and the step of receiving a corresponding reflected signal in step A comprises the reader obtaining a first received signal on the first frequency f1 at a first time, and obtaining a second received signal on the second frequency f2 at a second time, where the first time and the second time are different.

The step of subjecting the reflected signal received to a combining operation to obtain a combined received signal in step B comprises B1. obtaining a first in-phase component I1 and a first quadrature component Q1 from the first received signal, to construct a first signal vector V1=I1+jQ1, B2. obtaining a second in-phase component I2 and a second quadrature component Q2 from the second received signal, to construct a second signal vector V2=Q2+jI2, and B3. adding the first signal vector V1 and the second signal vector V2 together, to obtain a combined received signal vector V.

The at least two frequencies comprise a first frequency f1 and a second frequency f2, and the step in which the reader transmits a signal to the tag on at least two frequencies in step A comprises the reader generating a first transmission signal A cos(2πf1*t) on the first frequency f1, generating a second transmission signal B cos (2πf2*t) on the second frequency f2, and sending a combined transmission signal A cos (2πf1*t)+B cos(2πf2*t) to the tag.

The step of subjecting the reflected signal received to a combining operation to obtain a combined received signal in step B comprises the reader mixing the reflected signal received with an I path local oscillator signal $$I_{LO} = \frac{\cos(2\pi f1*t)}{H1} + \frac{\sin(2\pi f2*t)}{H2},$$

to obtain a combined in-phase component $I_{new}$, mixing the reflected signal received with a Q path local oscillator signal $$Q_{LO} = \frac{\sin(2\pi f1*t)}{H1} + \frac{\cos(2\pi f2*t)}{H2},$$

to obtain a combined quadrature component $Q_{new}$, obtaining the combined received signal based on the combined in-phase component $I_{new}$ and the combined quadrature component $Q_{new}$, where the H1 is a first signal attenuation on the first frequency f1, and the H2 is a second signal attenuation on the second frequency f2.

Before step A, the method further comprises C. setting the first frequency f1 and the second frequency f2, which are different from one another. After step B, the method further comprises D. after incrementing by 1 the number of tag locating operations performed, determining whether it has reached a preset threshold; if it has, then terminating the process, otherwise changing the first frequency f1 and/or the second frequency f2 to increase the frequency difference therebetween, and returning to step A; or after step B, the method further comprises E. comparing the current tag location result with a historical tag location result, and if the difference therebetween is less than a preset threshold, then terminating the process, otherwise changing the first frequency f1 and/or the second frequency f2 to increase the frequency difference therebetween, and returning to step A.

The step of mapping the combined received signal to a constellation point on a constellation diagram for the purpose of locating the tag in step B comprises: determining the tag distance d between the tag and the reader based on a correlation between tag distance d and constellation point vector angle θ.

The correlation between tag distance d and constellation point vector angle θ is: the vector angle θ of the constellation point is directly proportional to $$\frac{2d}{c}(f2-f1),$$

where c is the speed of light.

The step of mapping the combined received signal to a constellation point on a constellation diagram for the purpose of locating the tag in step B comprises determining a first constellation point locus when the tag is in a first state on the basis of the combined received signal, and finding a first boundary position and a second boundary position of the first constellation point locus on the constellation diagram, determining a second constellation point locus when the tag is in a second state based on the combined received signal, and finding the position of an external reflective object from the first boundary position and the second boundary position based on the second constellation point locus, so as to determine the tag position on the constellation diagram, where the external reflective object is another reflective object besides the tag, and the tag has different reflective properties in the first state and the second state, and determining the corresponding tag distance d based on the vector angle θ of the tag position on the constellation diagram.

The method further comprises the reader compares the tag distance d of one or more tags with a preset threshold, and reports information about any tag for which the tag distance d is in conformity with the preset threshold to a control center.

The step of mapping the combined received signal to a constellation point on a constellation diagram for the purpose of locating the tag in step B comprises measuring the tag distance d of the tag at different positions on the first frequency f1 and the second frequency f2, determining the speed of movement of the tag based on the distance between the positions and the time of movement of the tag, and estimating the path of movement of the tag based on different detected positions and the speed of movement.

The method further comprises arranging multiple readers to point in different directions, determining the tag distance d between the tag and each reader, and obtaining coordinates of the tag in three dimensions based on the multiple tag distances d.

Before step A, the method further comprises the reader measuring the average Received Signal Strength Indication (RSSI) value, and filtering out tags for which the actual RSSI value is less than the average RSSI value.

It is also an object of the invention to provide a radio frequency identification (RFID) reader, comprising a control unit for directing a frequency generation unit to generate at least two frequencies, a signal transmission unit for transmitting a signal to a tag on the at least two frequencies generated, where the control unit is further used for subjecting a reflected signal received by a signal receiving unit to a combining operation to obtain a combined received signal, and for mapping the combined received signal to a constellation point on a constellation diagram for the purpose of locating the tag.

The at least two frequencies comprise a first frequency f1 and a second frequency f2, where the signal receiving unit is used for obtaining a first received signal from the tag on the first frequency f1 at a first time, and for obtaining a second received signal from the tag on the second frequency f2 at a second time, where the first time and the second time are different.

The control unit is used for combining the first received signal with the second received signal to obtain the combined received signal.

The control unit is further used for obtaining a first in-phase component I1 and a first quadrature component Q1 from the first received signal, and constructing a first signal vector V1=I1+jQ1, obtaining a second in-phase component I2 and a second quadrature component Q2 from the second received signal, and constructing a second signal vector V2=Q2+jI2, and adding the first signal vector V1 and the second signal vector V2 together to obtain a combined received signal vector V.

The at least two frequencies comprise a first frequency f1 and a second frequency f2; where the signal transmission unit is used for generating a first transmission signal A cos(2πf1*t) on the first frequency f1, generating a second transmission signal B cos(2πf2*t) on the second frequency f2, and emitting a combined transmission signal A cos(2πf1*t)+B cos(2πf2*t).

The signal receiving unit comprises a first receiving module and a second receiving module, where the first receiving module is used for mixing a signal obtained by a receiving antenna with an I path local oscillator signal $$I_{LO} = \frac{\cos(2\pi f1*t)}{H1} + \frac{\sin(2\pi f2*t)}{H2},$$

to obtain a combined in-phase component $I_{new}$ and supplies this to the control unit.

The second receiving module is used for mixing a signal obtained by the receiving antenna with a Q path local oscillator signal $$Q_{LO} = \frac{\sin(2\pi f1*t)}{H1} + \frac{\cos(2\pi f2*t)}{H2},$$

to obtain a combined quadrature component $Q_{new}$ and supplies this to the control unit, the control unit is used to obtain the combined received signal on the basis of the combined in-phase component $I_{new}$ and the combined quadrature component $Q_{new}$, where the H1 is a first signal attenuation on the first frequency f1, and the H2 is a second signal attenuation on the second frequency f2.

The reader further comprises a signal attenuation unit, where the control unit is used for directing the signal transmission unit to transmit a signal on the first frequency f1 to obtain H1 by channel estimation, and directing the signal attenuation unit to generate a first attenuation factor G1=1/H1 for the first frequency f1, and for directing the signal transmission unit to transmit a signal on the second frequency f2 to obtain H2 by channel estimation, and directing the signal attenuation unit to generate a second attenuation factor G2=1/H2 for the second frequency f2.

The control unit is further used for directing the frequency generation unit to change the first frequency f1 and/or the second frequency f2, to increase the frequency difference therebetween, and directing the signal transmission unit to transmit a signal to the tag on the first frequency f1 and second frequency f2 after the change.

The control unit is further used for determining the tag distance d between the tag and the reader based on a correspondence between tag distance d and constellation point vector angle θ.

The control unit is used for determining a first constellation point locus when the tag is in a first state on the basis of the combined received signal, and finding a first boundary position and a second boundary position of the first constellation point locus on the constellation diagram, determining a second constellation point locus when the tag is in a second state on the basis of the combined received signal, and finding the position of an external reflective object from the first boundary position and the second boundary position based on the second constellation point locus, so as to determine the tag position on the constellation diagram, where the external reflective object is another reflective object besides the tag, and the tag has different reflective properties in the first state and the second state, and determining the corresponding tag distance d based on the vector angle θ of the tag position on the constellation diagram.

The tag locating method and RFID reader provided in the discussed embodiments of the present invention transmit a signal to a tag on at least two frequencies, and map a combined received signal onto a constellation diagram, increasing the accuracy of the tag distance determined.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is described in further detail below by way of examples with reference to the accompanying drawings, in order to clarify the object, technical solution and advantages thereof, in which.

DETAILED DESCRIPTION OF THE PREFERRED EMBODIMENTS

The present invention proposes a solution based on at least two carriers. On the one hand, at least two carriers on different frequencies are used to activate a tag, so as to eliminate field nulls in a required zone. On the other hand, reflected signals on at least two carriers are combined and then mapped to a constellation point on a constellation diagram, to construct a special IQ structure. In this structure, each point uniquely represents one tag distance in the reading zone. Thus, by finding the locus of the constellation point in the IQ structure (also called a constellation diagram), and using a particular pattern recognition method to analyze this locus, it is possible to identify a reflection from the tag and determine the tag distance. According to the method of the present invention, tags outside the required zone will be filtered out, so that a controlled reading zone can be achieved even in a complex environment.

Specifically, the present invention proposes a method for locating a tag using a radio frequency identification (RFID) reader, comprising: A. the reader transmitting a signal to the tag on at least two frequencies and receiving a corresponding reflected signal; B. subjecting the reflected signal received to a combining operation to obtain a combined received signal, and mapping the combined received signal to a constellation point on a constellation diagram, for the purpose of locating the tag.

Figure 1:
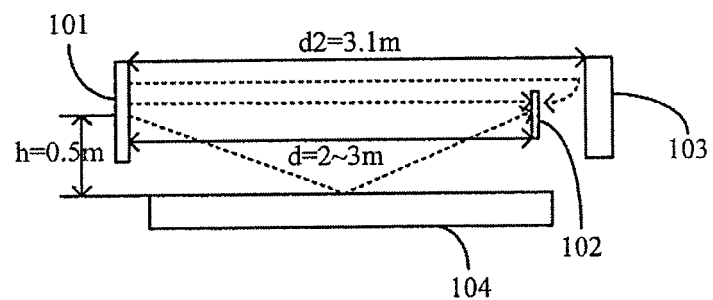
FIG. 1 shows the scenario in one embodiment of the present invention in which a signal emitted from a reader is transmitted along three paths.

The method proposed in the present invention uses at least two carriers to activate the tag, unlike conventional reader designs having only a single carrier. This is illustrated below using the example of two frequencies (a first frequency f1 and a second frequency f2); the situation is similar when more than two frequencies are used. In multi-path transmission scenarios, frequency diversity will occur in the RF signal on the two carriers, so that field nulls in the reading zone are eliminated. The improvement brought about by the present invention with respect to field nulls is demonstrated below by means of a simulation. As FIG. 1 shows, this simulation constructs a three-path transmission scenario. Specifically, one path is from the reader 101 to the tag 102, another path is from the reader 101 to a metal reflector 103, and another path is from the reader 101 to a metal base 104. The distance d between the reader 101 and the tag 102 (also called the tag distance) is approximately 2-3 m, while the distance d2 between the reader 101 and the metal reflector 103 is 3.1 m.

Figure 2:
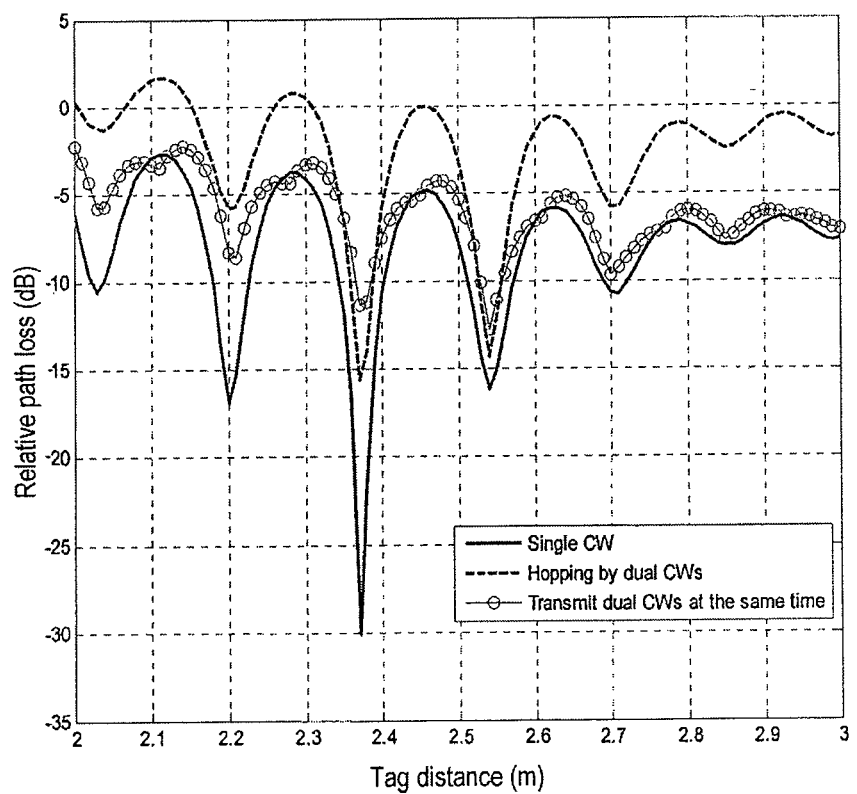
FIG. 2 is a simulated schematic diagram of a field null when three different schemes are used.

FIG. 2 uses three different schemes to simulate the relative path loss in the three-path transmission scenario shown in FIG. 1, so as to compare the field nulls of these three schemes. In scheme 1, only a single carrier is used. In scheme 2, two carriers are used with frequency hopping. In scheme 3, two carriers (865.7 MHz and 916.2 MHz) are used simultaneously. It can be seen from the simulation result that a field null represented by a relative path loss of −40 dB occurs in the single-carrier scheme, whereas schemes 2 and 3 can both eliminate this field null. Evidently, the field null problem can be ameliorated more effectively when a two-carrier scheme is used. It must be pointed out that the greater the difference in frequency between the two carriers, the better the frequency diversity result. Since the European Telecommunication Standards Institute (ETSI) standard (e.g. ETSI TR 102 649-2 V 1.1.1) will allow a new channel scheme to be set at 915 MHz, the two channels may be selected as f1=865.7 MHz and f2=916.2 MHz in European applications.

Figure 3:
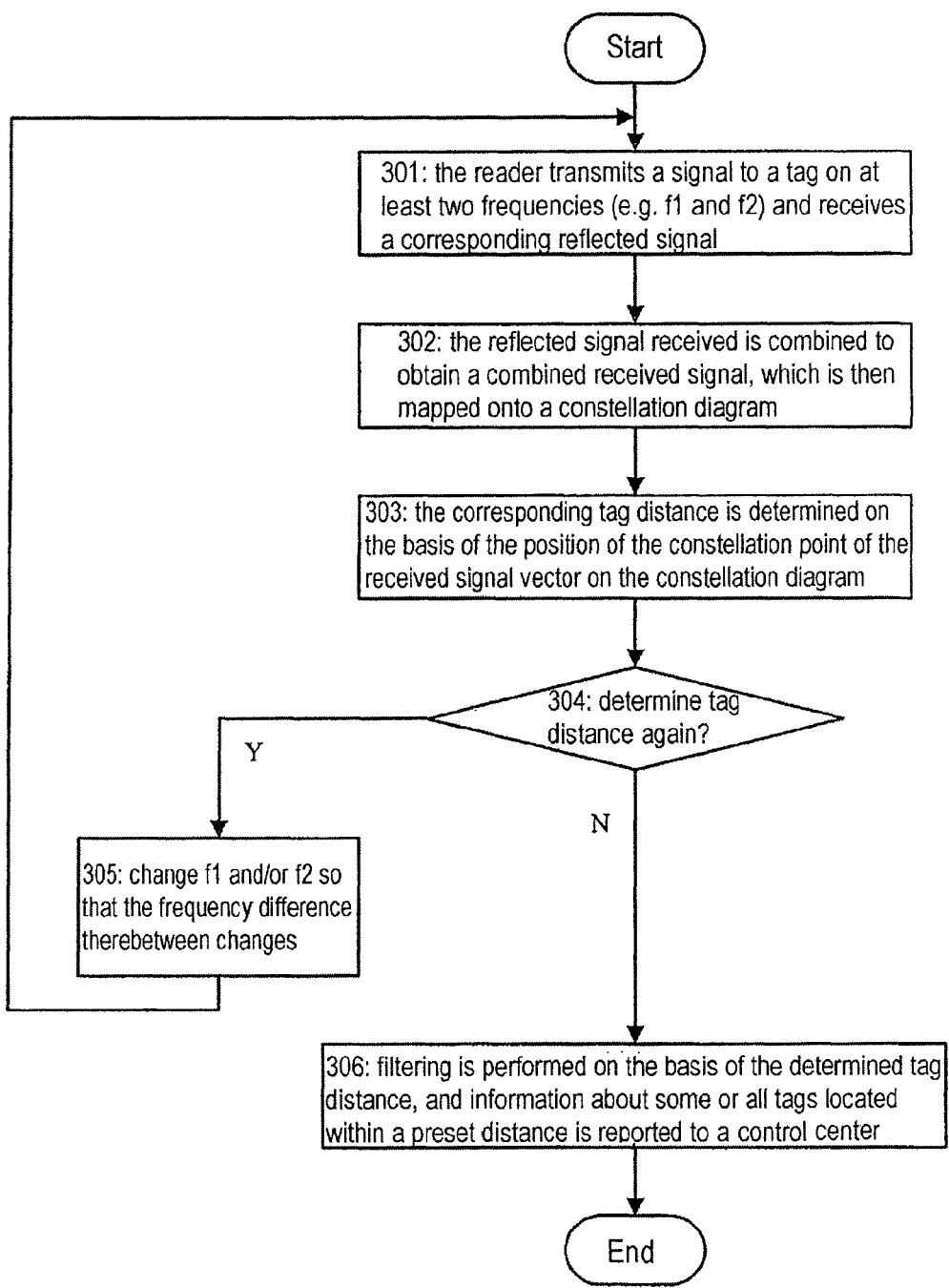
FIG. 3 is a flow chart of the method by which an RFID reader locates a tag in one embodiment of the present invention.

FIG. 3 is a flow chart of the method by which an RFID reader locates a tag in one embodiment of the present invention, comprising the following steps:

Step 301: the reader transmits a signal to a tag on at least two frequencies and receives a corresponding reflected signal.

It must be pointed out that reflected signals from different tags are received at different times (e.g., time slots), and can be distinguished from one another via tag IDs. Further, in the case of more complex external environments, not only the signal reflected by the tag but also signals reflected from external reflective objects (i.e., other reflective objects besides the tag) will be received at a particular time.

Step 302: the reflected signal received is subjected to a combining operation to obtain a combined received signal, which is then mapped onto a constellation diagram.

As mentioned above, movement of the tag by a distance of half a wavelength will lead to a phase change of 360 degrees, and this cannot be detected in a conventional in-phase quadrature (IQ) structure. In a conventional IQ structure, the in-phase component $I=\cos(2\pi f t_0)$ and the quadrature component $Q=\sin(2\pi f t_0)$. In order to overcome the abovementioned uncertainty of distance, the present invention proposes a new IQ mapping scheme in which at least two carriers are combined.

Taking the example of two carriers, in the present invention, $I'=\cos(2\pi f1*t_0)+\sin(2\pi f2*t_0)$ and $Q'=\sin(2\pi f1*t_0)+\cos(2\pi f2*t_0)$. Therefore in the special IQ structure of the present invention, the combined in-phase component $$I_{new} = \frac{I'}{\sqrt{(I')^2 + (Q')^2}},$$

and the combined quadrature component $$Q_{new} = \frac{Q'}{\sqrt{(I')^2 + (Q')^2}}.$$

Figure 4:
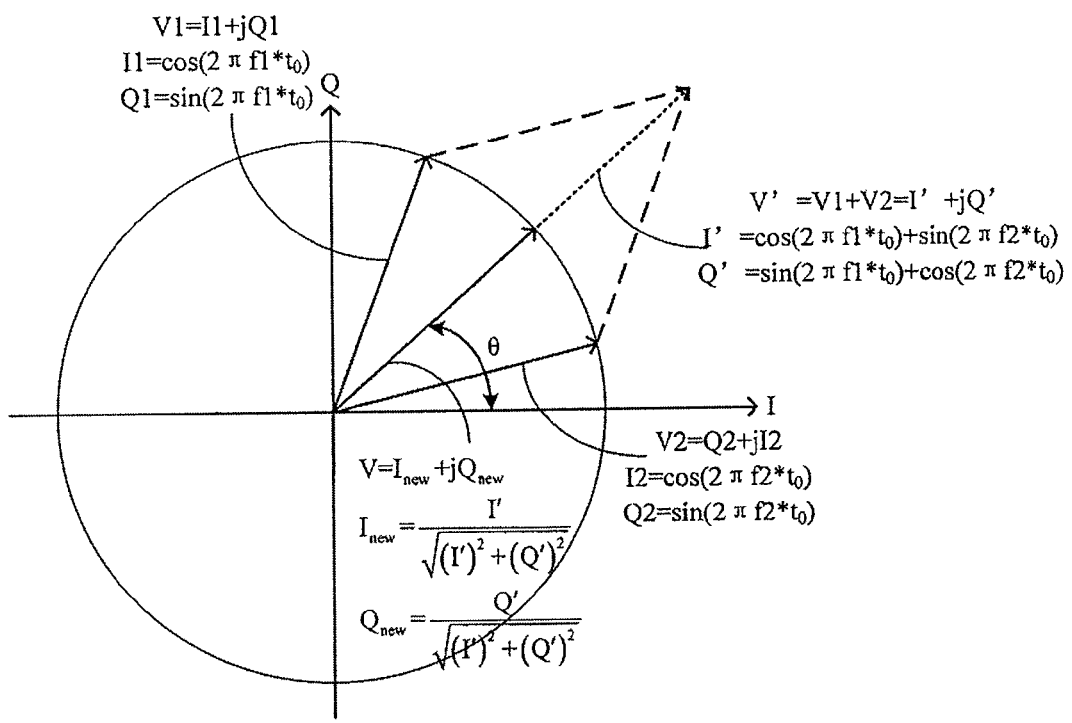
FIG. 4 is the in-phrase quadrature (IQ) structure obtained using two carriers in one embodiment of the present invention.
Figure 5:
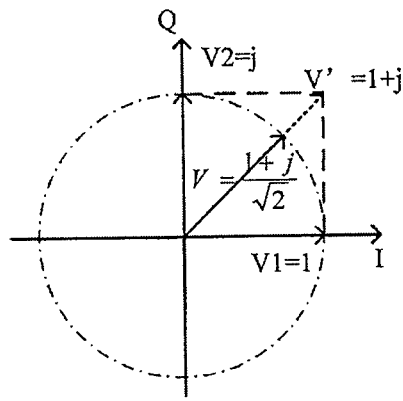
FIG. 5(a) shows the IQ structure when distance d=0.
FIG. 5(b) shows the IQ structure when distance d=0.5 m.
FIG. 5(c) shows the IQ structure when distance d=1.5 m.
Figure 5:
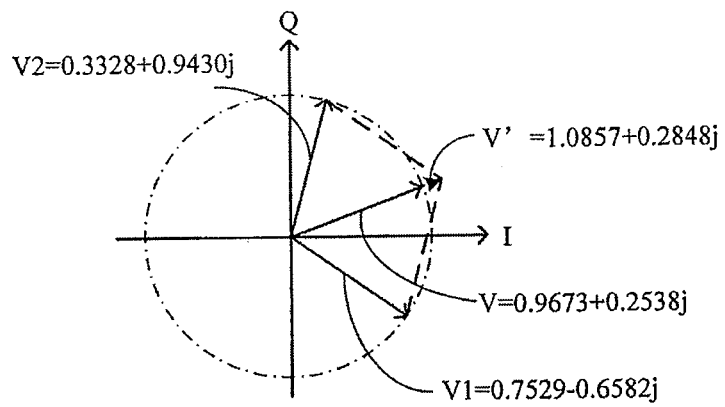
Figure 5:
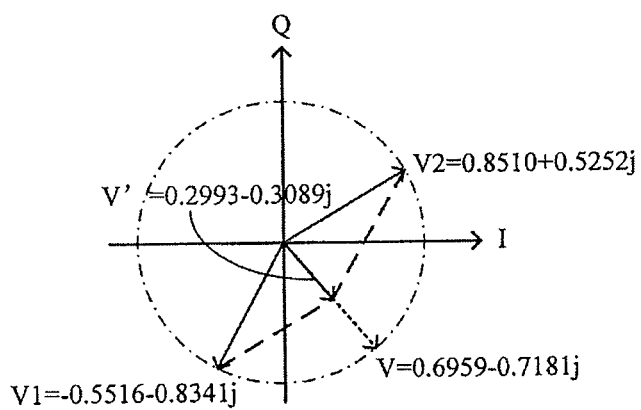

Specifically, FIG. 4 shows the vector sum of two carriers (continuous wave (CW)) in the special IQ structure. As FIG. 4 shows, the new IQ mapping may be interpreted as the sum of two vectors on two carriers. In the IQ structure defined as in the present invention, each constellation point (dependent on f2-f1) uniquely represents a tag distance in a particular zone. FIGS. 5(a)-(c) are three examples of distance mapping in the special IQ structure, where f1 and f2 are selected as 865.7 MHz and 916.2 MHz, respectively. Specifically, FIG. 5(a) shows the case where distance d=0, FIG. 5(b) shows the case where distance d=0.5 m, and FIG. 5(c) shows the case where d=1.5 m.

In one particular embodiment, the reader transmits a signal to a tag at different times on a first frequency f1 and a second frequency f2, respectively. Correspondingly, the reader receives a first received signal from the tag on the first frequency f1, and obtains a second received signal from the tag on the second frequency f2.

The difference in frequency between the second frequency f2 and first frequency f1 is $\Delta f$, and a first signal vector $V1=I1+jQ1$ is combined with a second signal vector $V2=Q2+jI2$ by the method shown in FIG. 4 to form a received signal vector $V=I_{new}+jQ_{new}$, to improve the result of uniquely representing the tag distance according to the vector angle.

In another particular embodiment, the reader transmits a signal to a tag on a first frequency f1 and a second frequency f2 at the same time, i.e. the reader emits a combined transmission signal A $\cos(2\pi f1*t)+B \cos(2\pi f2*t)$. Correspondingly, the reader mixes a reflected signal received with an I path local oscillator signal $$I_{LO} = \frac{\cos(2\pi f1*t)}{H1} + \frac{\sin(2\pi f2*t)}{H2}$$

to obtain a combined in-phase component $I_{new}$, mixes the reflected signal received with a Q path local oscillator signal $$Q_{LO} = \frac{\sin(2\pi f1*t)}{H1} + \frac{\cos(2\pi f2*t)}{H2}$$

to obtain a combined quadrature component $Q_{new}$, and then combines the combined in-phase component $I_{new}$ with the combined quadrature component $Q_{new}$ to form a received signal vector $V=I_{new}+jQ_{new}$.

It must be pointed out that in step 302 above, the manner in which a reflected signal received is combined may involve: determining an in-phase component $I=\cos(2\pi f t_0)$ and a quadrature component $Q=\sin(2\pi f t_0)$ on each frequency, combining the four components I1, I2, Q1 and Q2 on the two frequencies in an arbitrary manner to obtain a first signal vector V1 and a second signal vector V2, and then adding these two signal vectors together to obtain a received signal vector V. For example, in one particular embodiment, the first signal vector $V1=I1+jI2$ while the second signal vector $V2=Q1+jQ2$. Alternatively, the four components I1, I2, Q1 and Q2 on the two frequencies are combined in an arbitrary manner to obtain an I path local oscillator signal and a Q path local oscillator signal. For example, in another particular implementation, $$I_{LO} = \frac{\cos(2\pi f1*t)}{H1} + \frac{\cos(2\pi f2*t)}{H2}$$

and $$Q_{LO} = \frac{\sin(2\pi f1*t)}{H1} + \frac{\sin(2\pi f2*t)}{H2}.$$

Of course, in the case of three or more carriers, the method of combining two carriers may be extended, such as by combining a signal vector Vi on the $i^{th}$ carrier with a signal vector Vj on the $j^{th}$ carrier (e.g. by the method shown in FIG. 4) to obtain a signal vector Vm, then combining Vm with a signal vector Vk on the $k^{th}$ carrier, and so on until the signal vectors on all the carriers have been included in the combining operation, so as to obtain a final received signal vector V. Alternatively, the signal vector Vk on the $k^{th}$ carrier is combined with a signal vector Vp on a $p^{th}$ carrier to obtain a signal vector Vn, which is then combined with Vm.

Step 303: the tag is located based on the position of the constellation point of the received signal vector V on the constellation diagram, such as a corresponding tag distance d is determined.

Specifically, once the received signal vector V has been drawn on the constellation diagram, the tag distance d is determined based on the vector angle θ (see FIG. 4), each vector angle corresponding to one tag distance. It must be pointed out that the accuracy of the correspondence between vector angle and tag distance is dependent upon the difference in frequency between f2 and f1. With a smaller Δf, the reader can determine tags within a larger range of distances, but with a larger error. With a larger Δf, the reader can only determine tags within a smaller range of distances, with a correspondingly smaller error.

In one particular embodiment, the tag distance d is determined according to the formula $$\theta = \begin{cases} \dfrac{\pi}{4} + \pi \dfrac{2d}{c}(f2-f1), Q' > 0 \\ \dfrac{5\pi}{4} + \pi \dfrac{2d}{c}(f2-f1), Q' < 0 \end{cases}.$$

θ is the vector angle, d is the tag distance, c is the speed of light and $Q' = \sin(2\pi f1 \ast t_0) + \cos(2\pi f2 \ast t_0)$. In general, the vector angle θ is directly proportional to $$\dfrac{2d}{c}(f2-f1),$$

so that the mapping of the combined received signal on the constellation diagram can uniquely represent tag distance over a larger range.

Steps 304-305 are further performed, i.e., judging whether there is a need to determine tag distance d again, and if so, changing f1 and/or f2 so that the difference in frequency therebetween changes (e.g., if increases) and repeating steps 301-303, so as to estimate tag distance with greater accuracy.

It must be pointed out that the capacity for distance filtering of the special structure IQ provided in the present invention is dependent to a large degree on the difference in frequency f2−f1 between the two carriers. With a smaller frequency difference between the two carriers, the uniquely represented range of distances which can be obtained is larger. However, it is more difficult to distinguish between distances with a higher level of precision. On the other hand, with a larger frequency difference between the two carriers, the range of distances which can be uniquely represented is smaller, but distances can be distinguished from one another with a high level of precision.

Figure 6:
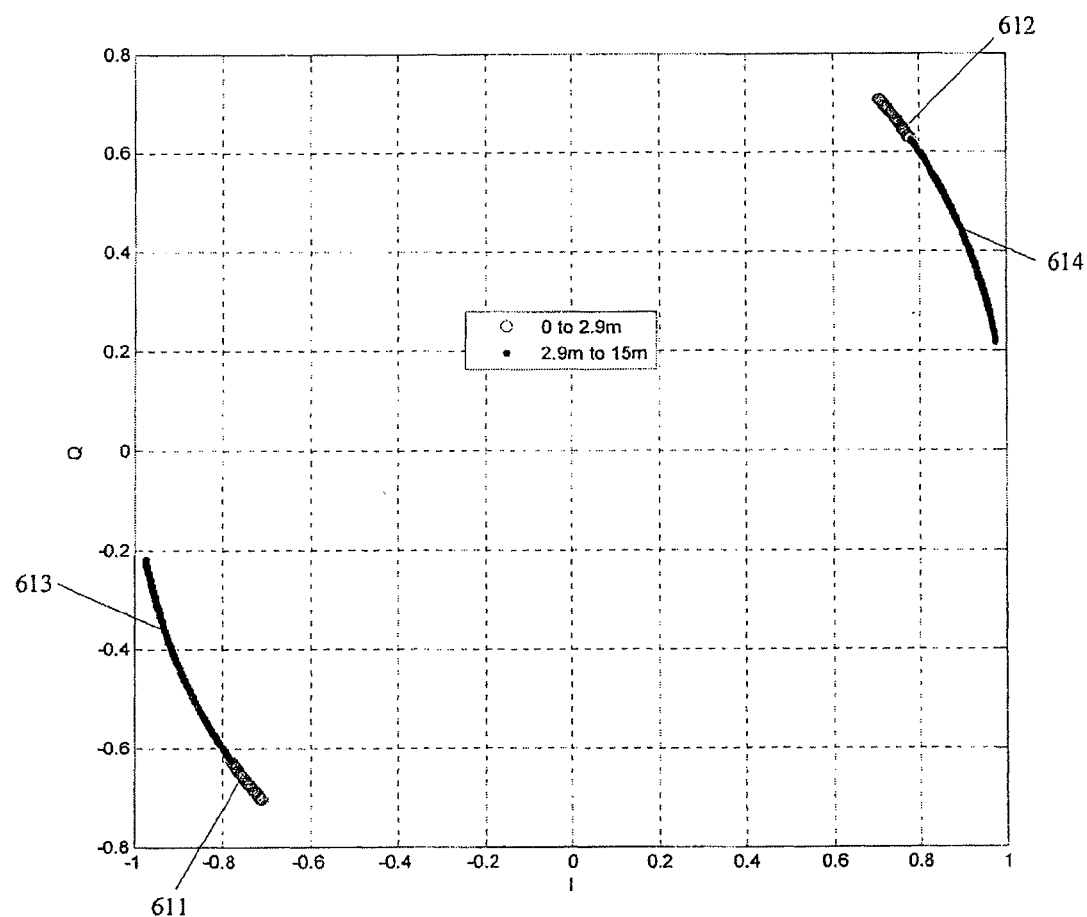
FIG. 6(a) is the IQ mapping when f1=865.7 MHz and f2=867.5 MHz.
FIG. 6(b) is the IQ mapping when f1=865.7 MHz and f2=916.2 MHz.
Figure 6:
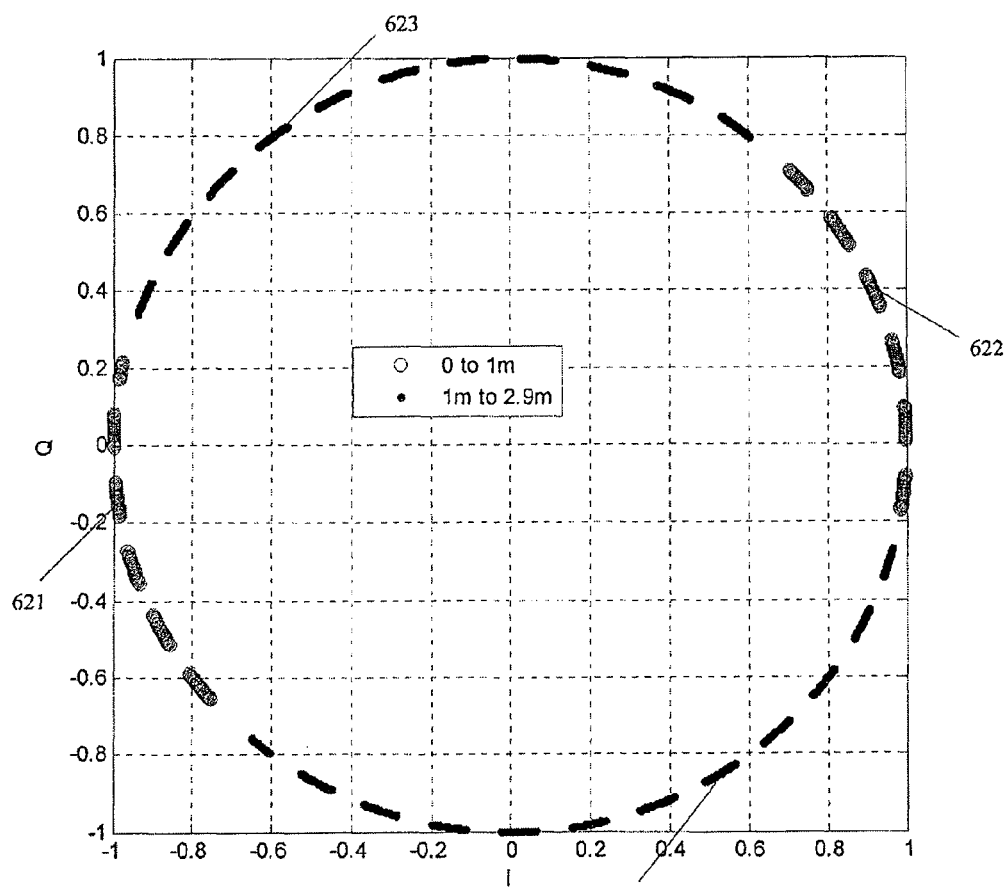

Specifically, FIGS. 6(a) and 6(b) show two examples of the IQ structure defined in the present invention. FIG. 6(a) is an IQ mapping when f1=865.7 MHz and f2=867.5 MHz; FIG. 6(b) is an IQ mapping when f1=865.7 MHz and f2=916.2 MHz. It can be seen that in FIG. 6(a) the frequency difference is smaller, and the range of distances which the IQ structure can map is 0-15 m, where 611 and 612 are 0-2.9 m while 613 and 614 are 2.9 m-15 m. However, the accuracy of distance mapping is not high, and the error arising from the fact that the constellation points have relatively small vector angles will result in a large divergence between the determined tag distance and the actual situation. In FIG. 6(b), the frequency difference is larger, and the range of distances that the IQ structure can map is 0-2.9 m, where 621 and 622 are 0-1 m while 623 and 624 are 1 m-2.9 m, but the accuracy of distance mapping is higher.

Figure 7:
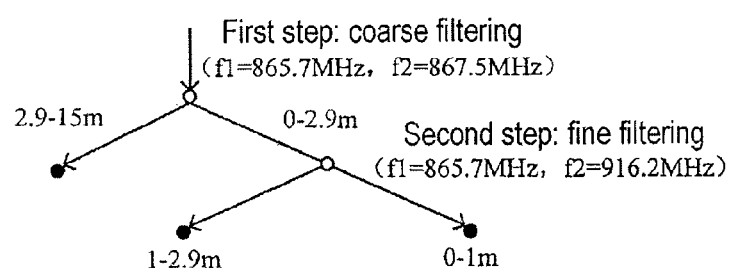
FIG. 7 is a flow chart of a method for performing two-stage distance filtering using different frequency combinations in one embodiment of the present invention.

Based on the situation described above, FIG. 7 shows the procedure of a method for performing N-stage distance filtering using different frequency combinations in one embodiment of the present invention, where N is any positive integer. In general, N is 2, i.e., two different frequency combinations are used for tag filtering, such that the tag is filtered in two different ways, i.e., coarsely and finely, so as to increase the accuracy of filtering. Of course, the use of two carriers with a relatively small frequency difference to determine tag distance is not the only way of performing coarse filtering; another way is to measure the average Received Signal Strength Indication (RSSI) value, and to filter out remote tags for which the RSSI value is too small.

Of course, in step 304 above, the reader can repeat steps 301-303 N times (where N is any positive integer) according to a predetermined setting, so as to obtain the required tag distance. For example, after incrementing by 1 the number of tag locating operations performed, the reader determines whether it has reached a preset number of times. If it has, the process is terminated or step 306 is performed; otherwise, the first frequency f1 and/or the second frequency f2 is/are changed to increase the difference in frequency therebetween, and the process returns to step 301. Alternatively, the reader compares the current tag location result with a historical tag location result (e.g., the previous tag location result or any previous tag location result), and if the difference therebetween is less than a preset threshold, then the process is terminated or step 306 is performed. For example, the reader can compare a preset difference value with the difference between the tag distance determined at this time and the tag distance determined the previous time, so as to determine whether it is necessary to determine the tag distance d again. With regard to step 305, the reader may also decide how to change f2 and/or f1 according to a predetermined setting, which is not elaborated superfluously here.

Step 306 is further performed in which the reader performs filtering on the basis of the determined tag distance, and reports information about some or all tags located within a preset distance to a control center or host computer, at which point the process ends.

Specifically, the preset distance may be a range of distances, i.e., the reader reports information about tags located within this range of distances. Alternatively, the preset distance may be a single value, and the reader correspondingly reports information about tags for which the tag distance is less than the preset distance. Using the method of step 306 enables the reader to filter the tags based on tag distance, so it can avoid providing tags which have been cross-read to the control center. As a result, the reporting of information to the control center by the reader becomes more accurate.

In the process shown in FIG. 3, based on the special IQ structure, the disclosed embodiments of the invention can further distinguish between reflections from tags and from the external environment and determine tag distance during the communication process by analyzing the loci of constellation points in the IQ structure. It must be pointed out that a tag has two reflection states, unlike fixed reflections from the external environment, and the loci of the constellation points of these two states in the IQ structure will also be somewhat different.

Figure 8:
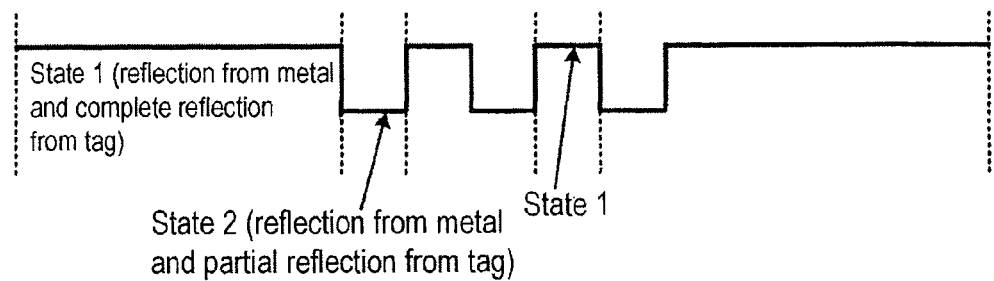
FIG. 8 is a schematic diagram of reflection states of metal and tag during communication.

In one application scenario of the disclosed embodiments of the invention, a metal plate (as an example of the external environment) is placed in front of the reader antenna. The metal plate always reflects signals completely, whereas the tag has two different reflective properties. For instance, the first state is complete signal reflection (which could be chip impedance open circuit or short circuit), while the second state is partial signal reflection (which could be matching of the chip impedance to the tag antenna, etc.). FIG. 8 is a schematic diagram of reflection states of metal and a tag in this application scenario. Specifically, before a backscatter FM0/Miller code is emitted, the tag completely reflects the signal (i.e., state 1). When the backscatter FM0/Miller code is emitted (e.g., the EPC stage in FIG. 13), the tag will reflect LOW and HIGH alternately in the code, where partial reflection is manifested as LOW in the code (i.e., state 2) and complete reflection is manifested as HIGH in the code.

Figure 9:
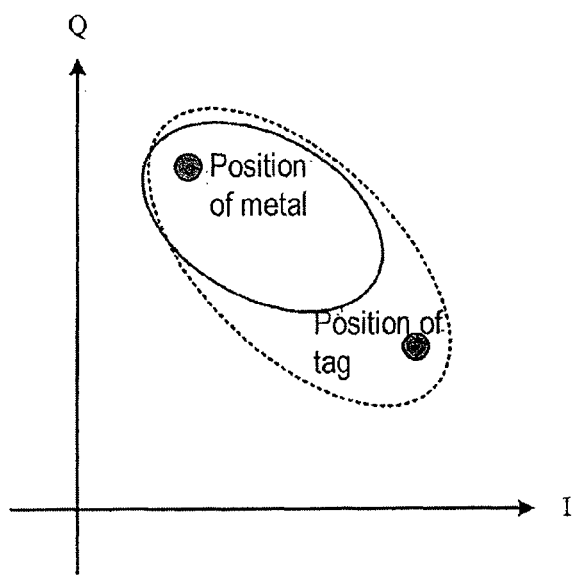
FIG. 9 shows the loci of constellation points in the IQ structure for two different states.

FIG. 9 shows the loci of constellation points in the IQ structure for two different states. In state 1, both metal and the tag reflect completely, so the constellation point in the IQ structure moves between the position of the metal and the position of the tag, the loci thereof being within the range indicated by the dotted line in FIG. 9. In state 2, the tag only partially reflects, so the locus of the constellation point will be closer to the position of the metal (the range thereof being indicated by the solid line in FIG. 9), and the position of the tag cannot be reached. Thus, by first determining two boundary points of the locus in state 1 and by then determining the position of the metal according to the locus in state 2, the position of the tag in the constellation diagram can be found. In addition, certain pattern recognition methods such as point clustering may also be used to distinguish between the position of the metal and the position of the tag in the IQ structure. On this basis, reflections from the tag can then be identified, and tag distance measured. It must be pointed out that the position of the metal and the position of the tag are each one constellation point on the constellation diagram. Of course, the above process can be carried out on the reader, and the tag information can be reported to the control center by the reader, the control center then finding the position of the tag on the constellation diagram based on the tag information.

Figure 10:
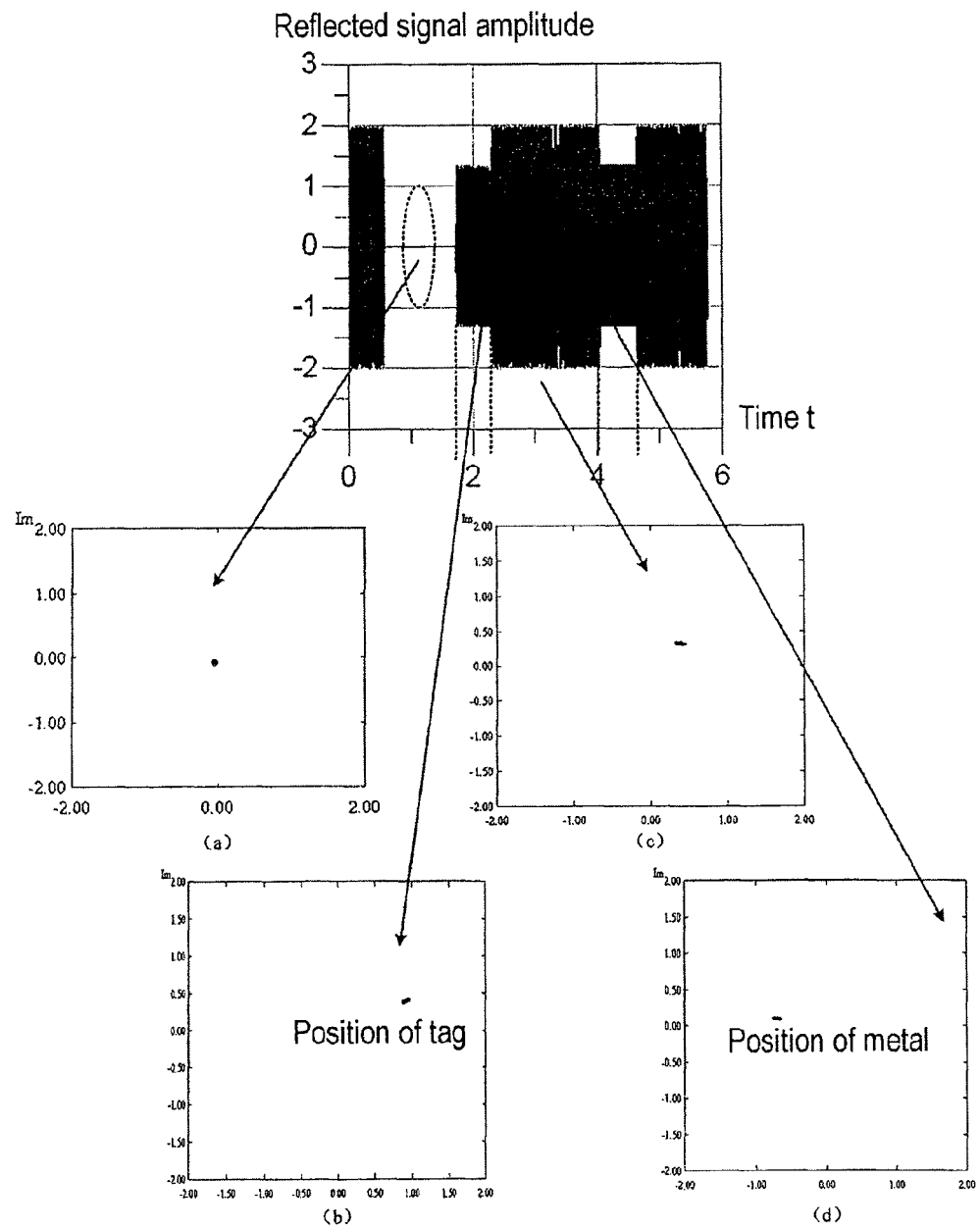
FIG. 10 shows constellation diagrams captured during simulation for four different states.

The method provided in the present invention is verified by way of simulation below. In this simulation, a tag is placed at a position 0.33 m from the reader antenna, and a metal plate is placed at a position 0.8 m from the reader antenna. FIG. 10 shows constellation diagrams captured during simulation for four different states. FIG. 10(a) shows a constellation point (0, 0) when there is no signal reflection. FIG. 10(b) shows a constellation point (0.93, 0.43) when there is only reflection from the tag located at d=0.33 m. FIG. 10(c) shows a constellation point when there is simultaneous reflection from both the tag and the metal. It must be pointed out that this constellation point moves between the two constellation points corresponding to tag reflection only and metal reflection only; FIG. 10(c) is merely the position thereof at a particular instant. FIG. 10(d) shows a constellation point (−1.39, 0.08) when there is only reflection from the metal located at d=0.8 m. It can be seen from the results of simulation shown in FIG. 10 that when only the tag reflects the signal, the constellation point remains at the position of the tag. When only the metal reflects the signal, the constellation point moves to the position of the metal. When the tag and the metal simultaneously reflect the signal, the constellation point lies between the above two positions, the pattern in which it moves being dependent upon the tag reflection state. Using certain pattern recognition methods, reflection from the tag can be identified, as can the corresponding tag distance.

Using the tag location method provided in the present invention, it is further possible to track tagged moving targets in a reflective environment (e.g., a production environment). Specifically, the path of movement of the tag is estimated as follows:

1. Positions of the tag where there is no field null on either of two frequencies are detected, and the tag distances for each position recorded.
2. The speed of movement of the tag is estimated based on the distance between the above positions and the time taken for the tag to move between the above positions.
3. Based on the speed of movement and previously detected positions where there is no field null (also called historical detection positions), interpolation or another method is used to estimate positions through which the tag has passed and which are located in a field null (e.g., positions which cannot be covered by the reader), to obtain the path of movement of the tag.

Compared with the prior art, the method provided in the disclosed embodiments of the invention transmits a signal to a tag on at least two carriers and correspondingly receives a reflected signal, combines the reflected signal received, and in turn locates the tag based on the combined received signal. Specifically, the present invention measures tag distance based on the combined received signal, uses the tag distance obtained to filter out remote tags, and thereby reduces the ambiguity of tag filtering. Further, the disclosed embodiments of the invention use the loci of combined received signals on a constellation diagram to distinguish between reflections from a tag and reflections from the surrounding environment (e.g., nearby metal), and will not be affected greatly by the surrounding environment. Further, the disclosed embodiments of the invention may also have multiple readers arranged to point in different directions, determine the tag distance d between a particular tag and each reader by the process shown in FIG. 3, and obtain the coordinates in three dimensions of that tag based on the multiple tag distances d, so as to more accurately ascertain the location of the tag.

Further, the present invention provides multiple radio frequency identification (RFID) readers suitable for use with the above tag locating method, comprising: a control unit, for directing a frequency generation unit to generate at least two frequencies; and a signal transmission unit, for transmitting a signal to the tag on the at least two frequencies generated. The control unit is further used for subjecting a reflected signal received by a signal receiving unit to a combining operation to obtain a combined received signal, and mapping the combined received signal to a constellation point on a constellation diagram for the purpose of locating the tag.

Embodiment 1

Figure 11:
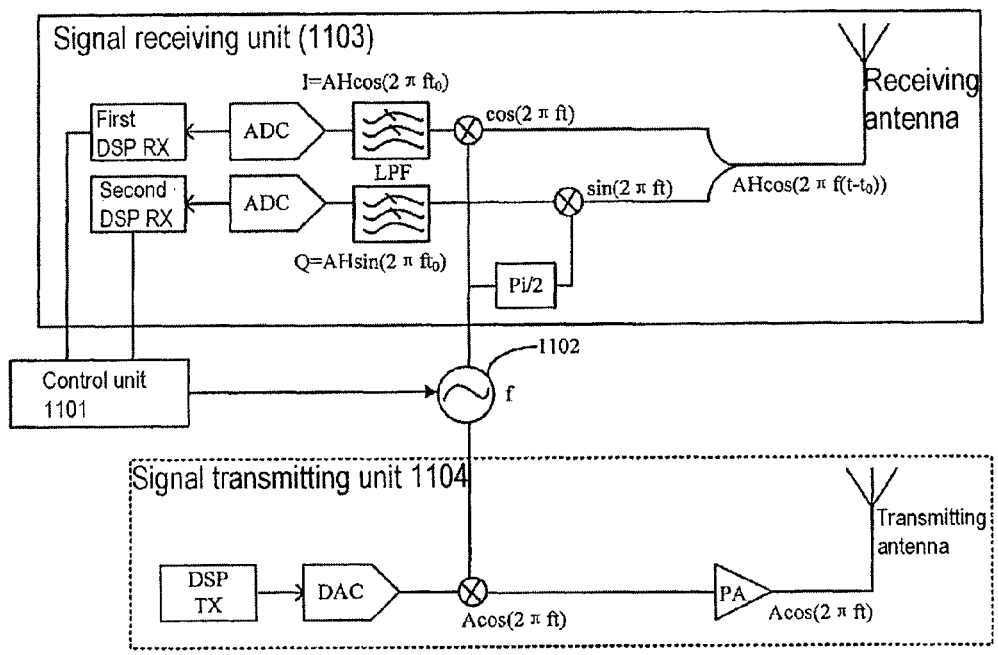
FIG. 11 is a schematic diagram of the transmission/reception (TX/RX) chain of a reader in one embodiment of the present invention.

FIG. 11 is a schematic diagram of the TX/RX chain of a reader in one embodiment of the present invention. In this embodiment, the software and/or hardware of an ordinary reader is modified and upgraded in a simple manner, enabling the reader to measure tag distance, and in turn to filter tags or determine the path of movement of a tag based on the tag distance d obtained. Specifically, the reader comprises at least one of the following units: a control unit 1101, a frequency generation unit 1102, a signal receiving unit 1103 and a signal transmission unit 1104.

In the signal receiving unit 1103, a signal obtained by a receiving (RX) antenna through communication with a particular tag is split into two lines. One line is mixed with a signal $\cos(2\pi ft)$ generated by the frequency generation unit 1102 before being processed in a low-pass filter (LPF) and an analog-to-digital conversion (ADC) module, and then supplied to the control unit 1101 by a first receiving digital signal processing (DSP RX) module. Another line is mixed with a signal $\sin(2\pi ft)$ obtained by subjecting a signal generated by the frequency generation unit 1102 to phase-shift processing, processed in an LPF and ADC module, and then supplied to the control unit 1101 by a second DSP RX module. Here, H reflects signal attenuation and circuit effects.

Specifically, the signal receiving unit 1103 obtains a first received signal $AH \cos(2\pi f1*(t-t_0))$ on the first frequency f1 at a first time, obtains a first in-phase component $I1=AH \cos(2\pi f1*t_0)$ and a first quadrature component $Q1=AH \sin(2\pi f1*t_0)$ from the first received signal, and supplies these to the control unit 1101. The signal receiving unit 1103 obtains a second received signal AH cos($2\pi f1*(t-t_0)$) on the second frequency f2 at a second time, obtains a second in-phase component I2=AH cos($2\pi f2*t_0$) a second quadrature component Q1=AH sin($2\pi f2*t_0$) from the second received signal, and supplies these to the control unit 1101. The first time and the second time are different.

In the signal transmission unit 1104, a transmitting digital signal processing (DSP TX) module sends a signal to a digital-to-analog conversion (DAC) module for processing. After passing through a mixer and an amplifier, the signal is output to the transmitting (TX) antenna.

The control unit 1101 is used for directing the frequency generation unit 1102 to generate the first frequency f1 and second frequency f2 at different times, for the purpose of transmitting signals to the tag. In one particular embodiment of the present invention, the frequency generation unit 1102 is an oscillator.

Further, the control unit 1101 is used for receiving a first in-phase component I1' supplied by the first DSP RX module and a first quadrature component Q1' supplied by the second DSP RX module, normalizing the I, Q values (i.e., I1' and Q1') received on the first frequency f1 to obtain I1 and Q1, and storing these as a first signal vector V1=I1+jQ1. It must be pointed out that the normalization operation is by no means essential. The signal received by the control unit 1101 may be a normalized first in-phase component I1 and normalized first quadrature component Q1. In other words, the first in-phase component may be pre-normalization I1' or post-normalization I1, or I1' may be equal to I1. Of course, processing of the first quadrature component is similar to that of the first in-phase component, and shall not be elaborated superfluously here.

$$I1 = \frac{I1'}{\sqrt{(I1')^2 + (Q1')^2}} = \cos(2\pi f1 * t_0)$$

$$Q1 = \frac{Q1'}{\sqrt{(I1')^2 + (Q1')^2}} = \sin(2\pi f1 * t_0)$$

Further, the control unit 1101 is used for normalizing the I and Q values (i.e., I2' and Q2') received on the second frequency f2 to obtain I2 and Q2 in a manner similar to that used for the first frequency f1 after receiving a second in-phase component I2' supplied by the first DSP RX module and a second quadrature component Q2' supplied by the second DSP RX module, and storing I2 and Q2 as a second signal vector V2=Q2+jI2. Similarly, the second in-phase component may be pre-normalization I2' or post-normalization I2, or I2' may be equal to I2. The situation is similar for the second quadrature component.

$$I2 = \frac{I2'}{\sqrt{(I2')^2 + (Q2')^2}} = \cos(2\pi f2 * t_0)$$

$$Q2 = \frac{Q2'}{\sqrt{(I2')^2 + (Q2')^2}} = \sin(2\pi f2 * t_0)$$

Further, the control unit 1101 is used to add the first signal vector V1 and the second signal vector V2 together, to obtain a combined received signal vector V=I+jQ for the tag, i.e., the final values of I and Q are as follows:

$$I_{new} = \frac{I1 + Q2}{\sqrt{(I1 + Q2)^2 + (I2 + Q1)^2}}$$

$$Q_{new} = \frac{Q1 + I2}{\sqrt{(I1 + Q2)^2 + (I2 + Q1)^2}}$$

Further, the control unit 1101 is used for mapping the combined received signal vector V onto a constellation diagram, and thereby determining the distance between the reader and the tag (also called tag distance d) based on the IQ structure.

It can be seen that two-step frequency hopping is applied in an ordinary reader to realize the reader in this embodiment; communication with the tag is performed in two steps using different frequencies (f1 and f2), and the ordinary reader is subjected to comparatively minor modifications to enable it to measure tag distance. Moreover, the I and Q values are normalized on each frequency, so that there is no need for channel attenuation information when constructing the IQ structure. In a particular embodiment, the control unit 1101 may be a hardware unit (e.g., a newly added MCU), or a software module, and is therefore easily added to the ordinary reader.

It must be pointed out that the reader provided in this embodiment must change frequency before obtaining the tag distance, and 20 ms are required for phase-locked loop (PLL) locking when the frequency is changed. In most applications, the distance moved by a tag in this period of time will not be too large (e.g., just 4 cm when the speed of movement reaches 2 m/s), and so the accuracy of distance filtering will not be affected.

Embodiment 2

Figure 12:
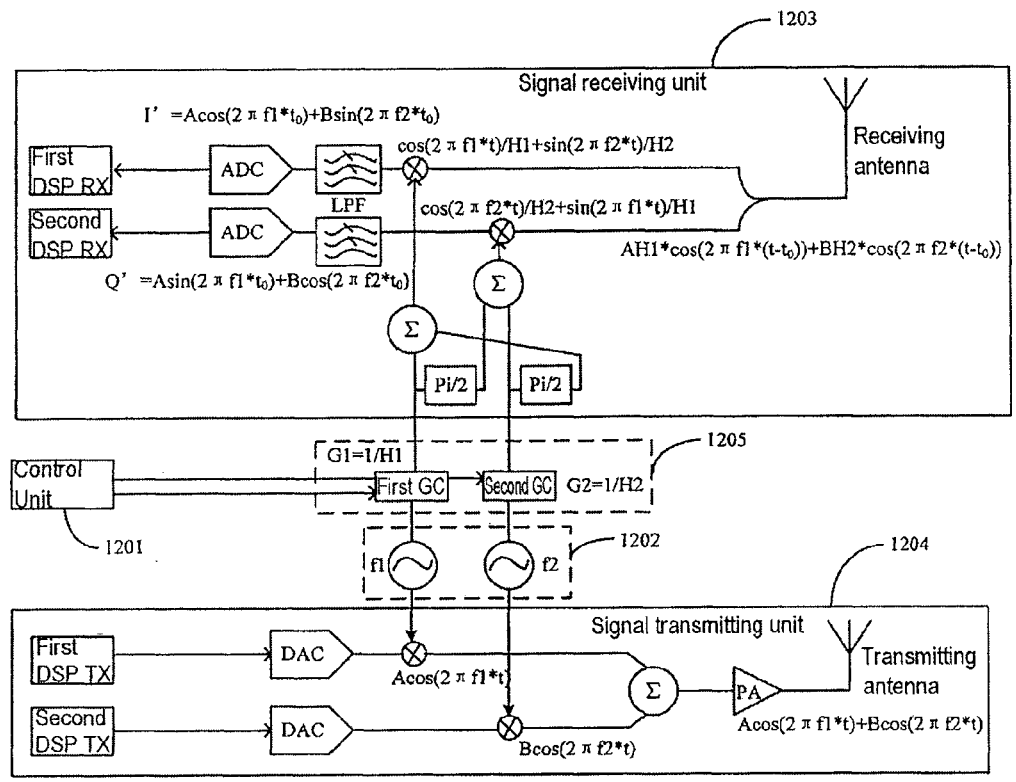
FIG. 12 is a schematic diagram of the structure of a dual-carrier reader in another embodiment of the present invention.

If the application is in an environment in which tags move at high speed, the reader provided in another embodiment of the present invention may be used to transmit two carriers (CW) simultaneously. FIG. 12 is a schematic diagram of the structure of a dual-carrier reader in another embodiment of the present invention; new hardware units for transmitting two CWs simultaneously have been added to the reader. Similarly to FIG. 11, the reader in FIG. 12 comprises: a control unit (which may be an MCU, etc.) 1201, a frequency generation unit 1202, a signal receiving unit 1203 and a signal transmission unit 1204, and may further comprise a signal attenuation unit 1205. The first DSP RX, second DSP RX, MCU, first DSP TX and second DSP TX form the digital processing part of the reader.

In the reader shown in FIG. 12, a first transmission signal A cos($2\pi f1*t$) is generated on f1 and a second transmission signal B cos($2\pi f2*t$) is generated on f2. These two signals are combined, and the transmission signal finally sent to the transmitting antenna is A cos($2\pi f1*t$)+B cos($2\pi f2*t$). The channel attenuation and circuit impact of each channel are different. As a result, the backscattered signal received from a tag is: AH1 cos($2\pi f1*(t-t_0)$)+BH2 cos($2\pi f2*(t-t_0)$). In one particular embodiment, f1=865.7 MHz and f2=916.2 MHz. By combining the above two carriers, local oscillator (LO) signals on the I channel and Q channel can be obtained.

$$I_{LO} = \frac{\cos(2\pi f1 * t)}{H1} + \frac{\sin(2\pi f2 * t)}{H2}$$

$$Q_{LO} = \frac{\sin(2\pi f1 * t)}{H1} + \frac{\cos(2\pi f2 * t)}{H2}$$

Signals obtained by the receiving antenna are mixed with the LO signals by means of a mixer to obtain the following I and Q values:

$$I' = A\cos(2\pi f1 * t_0) + B\sin(2\pi f2 * t_0)$$

$$Q' = A\sin(2\pi f1 * t_0) + B\cos(2\pi f2 * t_0)$$

An IQ structure to be used for distance filtering may then be constructed from these I and Q values.

Figure 13:
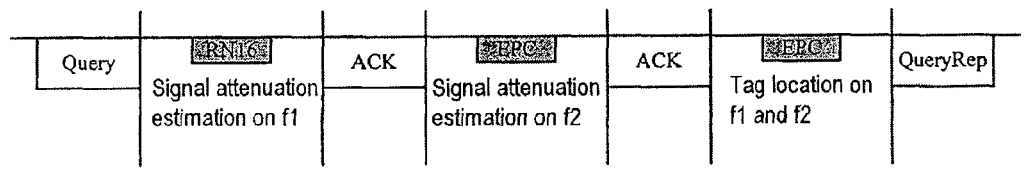
FIG. 13 shows the channel estimation process for a reader in one embodiment of the present invention.

In the above process, H1 is the channel attenuation and circuit impact on the first frequency f1, while H2 is the channel attenuation and circuit impact on the second frequency f2. Specifically, in order to compensate for the attenuation of each channel, a training process (e.g., channel estimation) may be used to obtain H1 and H2; compensation for channel attenuation can then be provided for each carrier via automatic gain control (AGC). FIG. 13 shows the channel estimation process for a reader in one embodiment of the present invention. Specifically, the reader emits a query signal, and transmits a signal on the first frequency f1 to estimate the signal attenuation on f1 (including channel attenuation and circuit impact, etc.). The reader then emits an acknowledge (ACK) signal, and transmits a signal on the second frequency f2 in order to estimate the signal attenuation on f2. The reader then emits another ACK signal, and transmits a signal on the first frequency f1 and the second frequency f2 simultaneously to measure tag distance. In other words, during communication between the reader and the tag, the reader first estimates signal attenuation on each carrier (f1 and f2) separately by communicating with the tag, and then emits a signal on f1 and f2 to measure tag distance. It must be pointed out that when the first channel attenuation H1 is being estimated, the MCU suppresses signal transmission on the second frequency f2 by controlling the second GC. Similarly, when the second signal attenuation H2 is being estimated, the MCU suppresses signal transmission on the first frequency f1 by controlling the first GC.

Clearly, the tag locating method and reader provided in the embodiments of the present invention comprise at least one of the following solutions:

1. Using at least two carriers to reduce field nulls in an RFID system (e.g., a UHF passive RFID system, etc.), and mapping a combined received signal onto a constellation diagram, so as to locate tags with greater convenience and accuracy based on constellation points. For example, the reader uses two carriers to activate a tag, and combines the two carriers to construct a special IQ structure. Each constellation point in this IQ structure can uniquely represent one tag distance in a particular zone when the Δf between the two carriers used is fixed.

2. Using distance filtering in N steps, where N is any positive integer. For instance, when using a two-stage filtering solution to accurately locate a tag, coarse filtering is first performed based on RSSI detection to filter out remote tags. Fine filtering is then used to identify tags in the required zone. Of course, a combination of more frequencies may be used for distance filtering, to increase the range of distances which can be represented uniquely.

3. Correctly identifying reflections from tags in a complex environment by analyzing the loci of constellation points in the IQ structure, so as to determine the corresponding tag distances.

4. Tracking moving targets by continuous distance measurement and analysis of historical detection points.

While there have been shown, described, and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for locating a tag using a radio frequency identification (RFID) reader, the method comprising:
   A. transmitting, by the reader, a signal to the tag at a plurality of frequencies and receiving a corresponding reflected signal;
   B. subjecting the reflected signal received to a combining operation to obtain a combined received signal, and mapping the combined received signal to a constellation point on a constellation diagram to locate the tag.

2. The method as claimed in claim 1, wherein the plurality of frequencies comprise a first frequency f1 and a second frequency f2; and the step of receiving a corresponding reflected signal in step A comprises:
   obtaining, by the RFID reader, a first received signal at the first frequency f1 at a first time, and obtaining a second received signal at the second frequency f2 at a second time;
   wherein the first time and second times are different.

3. The method as claimed in claim 2, wherein the step of subjecting the reflected signal received to the combining operation to obtain the combined received signal in step B comprises:
   B1. obtaining a first in-phase component I1 and a first quadrature component Q1 from the first received signal to construct a first signal vector in accordance with the relationship V1=I1+jQ1;
   B2. obtaining a second in-phase component I2 and a second quadrature component Q2 from the second received signal to construct a second signal vector V2=Q2+jI2; and
   B3. adding the first signal vector V1 and the second signal vector V2 together to obtain a combined received signal vector V.

4. The method as claimed in claim 1, wherein the plurality of frequencies comprise a first frequency f1 and a second frequency f2, and the step in which the RFID reader transmits the signal to the tag at the plurality of frequencies in step A comprises:
   generating, by the RFID reader, a first transmission signal A cos(2πf1*t) at the first frequency f1;
   generating a second transmission signal B cos(2πf2*t) at the second frequency f2; and
   sending a combined transmission signal A cos(2πf1*t)+B cos(2πf2*t) to the tag; and
   wherein the step of subjecting the reflected signal received to the combining operation to obtain the combined received signal in step B comprises:
   mixing, by the RFID reader, the reflected signal received with an in-phase I path local oscillator signal $$I_{LO} = \frac{\cos(2\pi f1 * t)}{H1} + \frac{\sin(2\pi f2 * t)}{H2}$$

to obtain a combined in-phase component $I_{new}$;
mixing the reflected signal received with a quadrature Q path local oscillator signal $$Q_{LO} = \frac{\sin(2\pi f1 * t)}{H1} + \frac{\cos(2\pi f2 * t)}{H2}$$

to obtain a combined quadrature component $Q_{new}$; and
obtaining the combined received signal based on the combined in-phase component $I_{new}$ and the combined quadrature component $Q_{new}$;
wherein H1 is a first signal attenuation on the first frequency f1, and H2 is a second signal attenuation on the second frequency f2.

5. The method as claimed in claim 1, wherein before step A, the method further comprises:
C. setting the first frequency f1 and the second frequency f2, which are different from one another;
wherein, after step B, the method further comprises one of:
D. after incrementing by 1 a number of tag locating operations performed, determining whether the number of tag locating operations performed has reached a preset threshold and, if the number of tag locating operations performed has reached the preset threshold, then terminating the process, otherwise changing at least one of the first frequency f1 and the second frequency f2 to increase a frequency difference therebetween, and returning to step A; and
E. comparing a current tag location result with a historical tag location result and, if a difference therebetween is less than a preset threshold, then terminating the process, otherwise changing at least one of the first frequency f1 and the second frequency f2 to increase the frequency difference therebetween, and returning to step A.

6. The method as claimed in claim 1, wherein the step of mapping the combined received signal to the constellation point on the constellation diagram to locate the tag in step B comprises:
determining a tag distance d between the tag and the RFID reader based on a correlation between the tag distance d and a constellation point vector angle θ.

7. The method as claimed in claim 6, wherein the correlation between the tag distance d and constellation point vector angle θ is directly proportional to $$\frac{2d}{c}(f2 - f1);$$

wherein c is the speed of light.

8. The method as claimed in claim 6, wherein the step of mapping the combined received signal to the constellation point on the constellation diagram to locate the tag in step B comprises:
determining a first constellation point locus when the tag is in a first state based on the combined received signal, and finding a first boundary position and a second boundary position of the first constellation point locus on the constellation diagram;
determining a second constellation point locus when the tag is in a second state based on the combined received signal, and finding a position of an external reflective object from the first boundary position and the second boundary position based on the second constellation point locus to determine the tag position on the constellation diagram, the external reflective object being another reflective object besides the tag, and the tag having different reflective properties in the first and the second states; and
determining a corresponding tag distance based on the constellation point vector angle θ of the tag position on the constellation diagram.

9. The method as claimed in claim 1, further comprising:
comparing, by the RFID reader, a tag distance d of at least one tag with a preset threshold, and reporting to a control center information about any tag for which the tag distance d conforms to the preset threshold.

10. The method as claimed in claim 1, wherein the step of mapping the combined received signal to the constellation point on the constellation diagram to locate the tag in step B comprises:
measuring a tag distance d of the tag at different positions on a first frequency f1 and a second frequency f2;
determining a speed of movement of the tag based on a distance between the different positions and the time of movement of the tag; and
estimating a path of movement of the tag based on different detected positions and the speed of movement.

11. The method as claimed in claim 1, further comprising:
arranging multiple readers to point in different directions;
determining a tag distance d between the tag and each RFID reader of a plurality of RFID readers; and
obtaining coordinates of the tag in three dimensions based on multiple tag distances d.

12. The method as claimed in claim 1, wherein before step A, the method further comprising:
measuring, by the RFID reader, an average Received Signal Strength Indication (RSSI) value; and
filtering out tags for which an actual RSSI value is less than the average RSSI value.

13. A radio frequency identification (RFID) reader, comprising:
a controller for directing a frequency generation unit to generate a plurality of frequencies; and
a signal transmitter for transmitting a signal to a tag at the generated plurality of frequencies;
wherein the controller further subjects a reflected signal received by a signal receiver to a combining operation to obtain a combined received signal, and maps the combined received signal to a constellation point on a constellation diagram to locate the tag.

14. The RFID reader as claimed in claim 13, wherein the plurality of frequencies comprise a first frequency f1 and a second frequency f2;
wherein the signal receiver obtains a first received signal from the tag at a first frequency f1 at a first time, and obtains a second received signal from the tag at a second frequency f2 at a second time, the first and seconds times being different; and
wherein the controller combines the first received signal with the second received signal to obtain the combined received signal.

15. The RFID reader as claimed in claim 14, wherein the control unit obtains a first in-phase component I1 and a first quadrature component Q1 from the first received signal, and constructs a first signal vector in accordance with the relationship V1=I1+jQ1;

wherein the control unit obtains a second in-phase component I2 and a second quadrature component Q2 from the second received signal, and constructing a second signal vector in accordance with the relationship V2=Q2+jI2; and wherein the control unit adds the first signal vector V1 and the second signal vector V2 together to obtain a combined received signal vector V.

16. The RFID reader as claimed in claim 13, wherein the at least two frequencies comprise: a first frequency f1 and a second frequency f2;

wherein the signal transmitter generates a first transmission signal A cos(2πf1*t) at a first frequency f1, generates a second transmission signal B cos(2πf2*t) at a second frequency f2, and emits a combined transmission signal A cos(2πf1*t)+B cos(2πf2*t).

17. The RFID reader as claimed in claim 16, wherein the signal receiver comprises a first receiving module and a second receiving module;

wherein the first receiving module mixes a signal obtained by a receiving antenna with an in-phase I path local oscillator signal $$I_{LO} = \frac{\cos(2\pi f1 * t)}{H1} + \frac{\sin(2\pi f2 * t)}{H2}$$

to obtain a combined in-phase component $I_{new}$, and supplies this to the control unit;

wherein the second receiving module mixes a signal obtained by the receiving antenna with a quadrature Q path local oscillator signal $$Q_{LO} = \frac{\sin(2\pi f1 * t)}{H1} + \frac{\cos(2\pi f2 * t)}{H2}$$

to obtain a combined quadrature component $Q_{new}$, and supplies the combined quadrature component $Q_{new}$ to the controller;

wherein the controller obtains the combined received signal based on the combined in-phase component $I_{new}$ and the combined quadrature component $Q_{new}$;

wherein H1 is a first signal attenuation on the first frequency f1, and H2 is a second signal attenuation on the second frequency f2.

18. The RFID reader as claimed in claim 17, further comprising:

a signal attenuator;

wherein the control unit directs the signal transmitter to transmit a signal on the first frequency f1 to obtain H1 by channel estimation, and directs the signal attenuation unit to generate a first attenuation factor in accordance with the relationship G1=1/H1 for the first frequency f1, directs the signal transmission unit to transmit a signal at the second frequency f2 to obtain H2 by channel estimation, and directs the signal attenuator unit to generate a second attenuation factor in accordance with the relationship G2=1/H2 for the second frequency f2.

19. The RFID reader as claimed in claim 13, wherein the controller further directs the frequency generator to at least one of change a first frequency f1 and a second frequency f2 to increase a frequency difference therebetween, and directs the signal transmitter to transmit a signal to the tag at the first frequency f1 and at the second frequency f2 after the change.

20. The RFID reader as claimed in claim 13, wherein the controller further determines a tag distance d between the tag and the RFID reader based on a correspondence between the tag distance d and a constellation point vector angle θ.

21. The RFID reader as claimed in claim 20, wherein the controller determines a first constellation point locus when the tag is in a first state based on the combined received signal, finds a first boundary position and a second boundary position of the first constellation point locus on the constellation diagram, determines a second constellation point locus when the tag is in a second state based on the combined received signal, and finds a position of an external reflective object from the first and second boundary positions based on the second constellation point locus to determine the tag position on the constellation diagram, the external reflective object being another reflective object besides the tag, and the tag having different reflective properties in the first state and the second state, and determines a corresponding tag distance d based on the vector angle θ of the tag position on the constellation diagram.

* * * * *